Sept. 13, 1966         J. MARSH ETAL         3,272,124

SOLID PROPELLANT ACTUATION SYSTEM

Original Filed Nov. 28, 1960         2 Sheets-Sheet 1

INVENTORS
JOHN MARSH
GIRARD D. REID
DONALD M. CROSE

BY

ATTORNEY

Sept. 13, 1966    J. MARSH ETAL    3,272,124
SOLID PROPELLANT ACTUATION SYSTEM
Original Filed Nov. 28, 1960    2 Sheets-Sheet 2

INVENTORS
JOHN MARSH
GIRARD D. REID
BY  DONALD M. CROSE

ATTORNEY 3,272,124
SOLID PROPELLANT ACTUATION SYSTEM
John Marsh, Santa Fe Springs, Calif., Girard D. Reid, Battle Creek, Mich., and Donald M. Crose, Sunnyvale, Calif., assignors, by mesne assignments, to Pneumo Dynamics Corporation, Cleveland, Ohio, a corporation of Delaware
Original application Nov. 28, 1960, Ser. No. 72,140. Divided and this application Sept. 27, 1963, Ser. No. 318,469
1 Claim. (Cl. 102—50)

This is a division of application Serial No. 72,140, filed Nov. 28, 1960, now abandoned.

This invention relates generally to actuation mechanisms for control surfaces of air vehicles and more particularly to a lightweight, short duty control actuation system suitable for use in rockets and the like.

It is an important object of this invention to provide a gas operated actuation system utilizing a solid propellant gas generator as a source of power.

It is another important object of this invention to provide an actuation system incorporating a solid propellant gas generator and suitable devices therefor.

It is another important object of this invention to provide an actuation system suitable for use in rockets and the like to provide the stabiliaztion and directional control for such devices.

It is another object of this invention to provide a rocket control system suitable for short duty life which is powered by a solid propellant gas generator.

Further objects and advantages will appear from the following description and drawings, wherein.

The actuating and control system is illustrated in connection with a typical rocket 10 which includes a rocket motor nozzle 11 at the aft end of the rocket and canard control surfaces 12 adjacent to the nose of the rocket. It should be understood that an actuating control system according to this invention could be used to operate other types of loads but that it is particularly suited for the actuation of rocket control surfaces.

Figure 1:
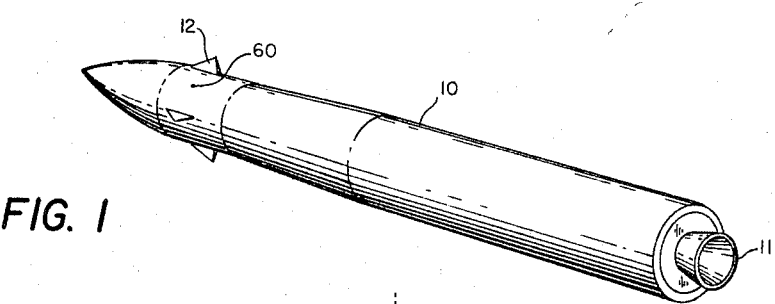
FIGURE 1 is a perspective view illustrating a typical rocket with canards or forward control surfaces adapted to be operated by the actuating system incorporating this invention.
Figure 2:
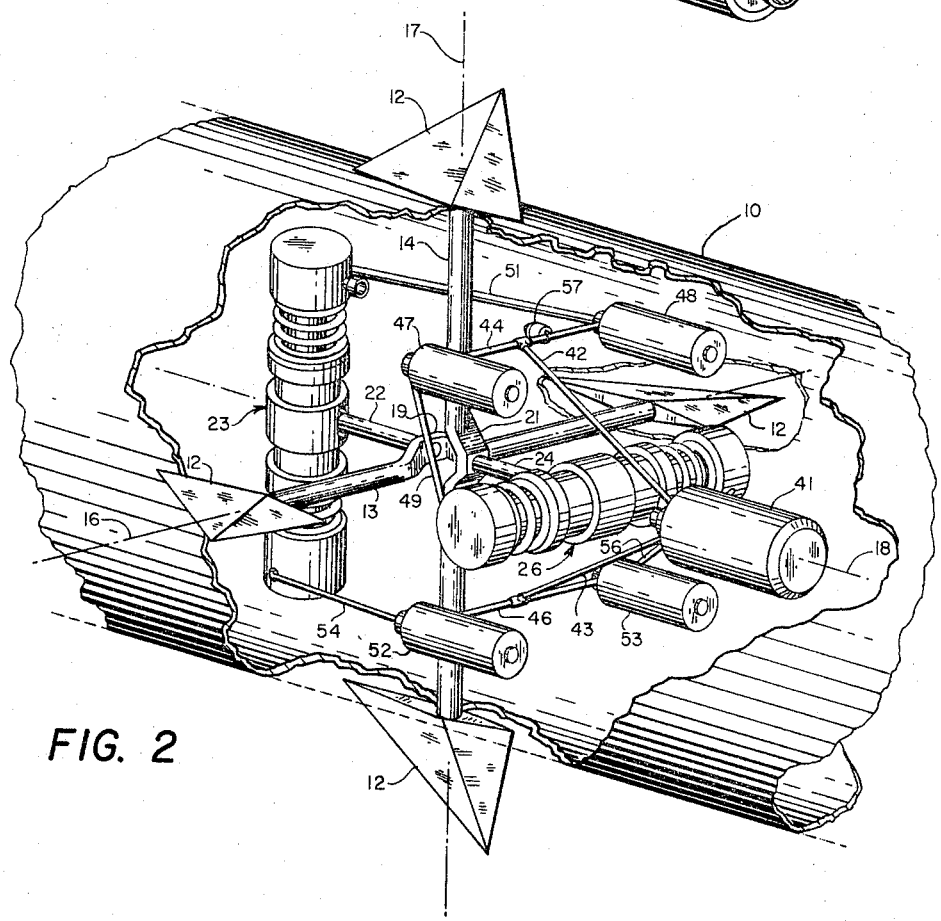
FIGURE 2 is a perspective schematic illustration of the actuating and control system for the rocket canards.
Figure 3:
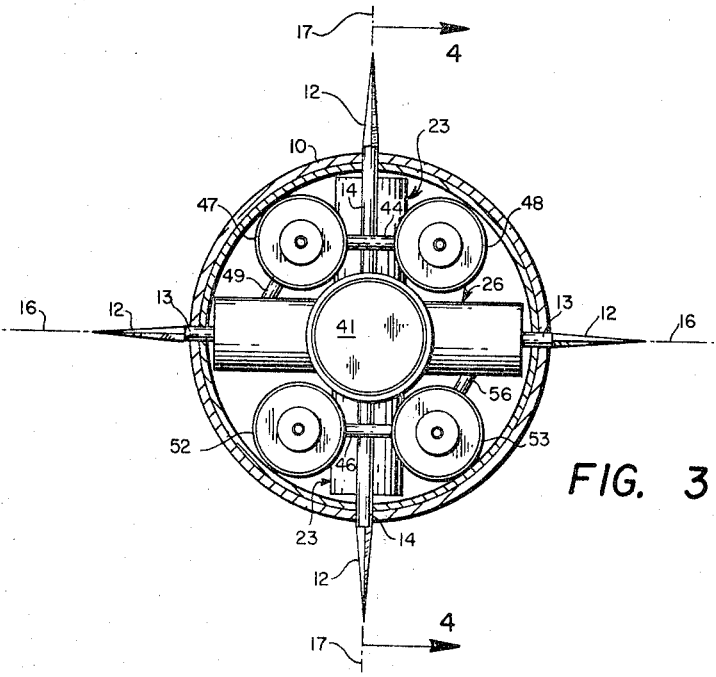
FIGURE 3 is a cross sectional view of the rockets illustrating the general arrangement of the actuating and control system.

In FIGURE 2, a schematic illustration with parts removed is shown to provide the clear understanding of the physical structure of the device and the space relationship of the elements. There are four canards 12 spaced around the circumference of the rocket 10 ninety degrees (90°) apart. A first opposite pair of canards is mounted on a first shaft 13 and a second opposite pair of canards is mounted on a second shaft 14. The two shafts 13 and 14 are journalled in the rocket 10 for rotation around their longitudinal axes 16 and 17 respectively which intersect at right angles on the longitudinal axis 18 of the rocket 10. Each of the shafts 13 and 14 is provided with offset portions 19 and 21 respectively which eliminate interference of the shafts at the intersection of the axes. An arms 22 is mounted on the offset portion 19 of the first shaft 13 and extends into a gas operated actuator 23 associated with and operable to rotate the first shaft 13. A second arm 24 is mounted on the offset portion 21 of the second shaft 14 and connects with a gas operated actuator 26 associated with and operable to rotate the second shaft 14 about its longitudinal axis 17. The first actuator 23 extends perpendicular to a plane containing the axes 16 and 18 and the second actuator 26 extends perpendicular to a plane containing the axes 17 and 18.

Figure 4:
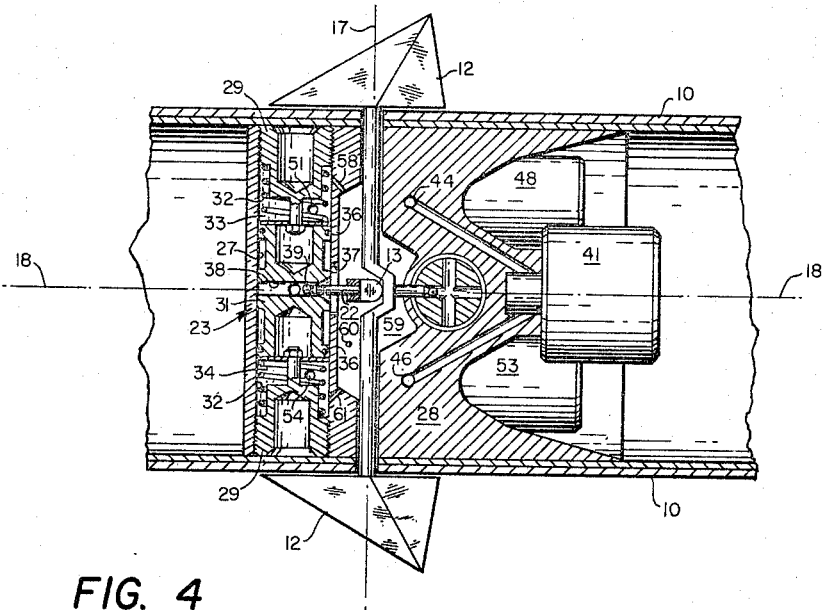
FIGURE 4 is a longitudinal section taken along 4—4 of FIGURE 3.

Both of the actuators 23 and 26 are identical so the structure of the actuator 23, shown in FIGURE 4, applies equally to the structure of the actuator 26. The actuator 23, best illustrated in FIGURE 4, includes a cylinder bore 27 formed in the base or body 28. The ends of the bore 27 are closed by similar end caps 29 threaded into each end of the bore. A piston 31 is located within the cylinder bore 27 between the two end caps 29 and is biased toward a neutral position by opposed coil springs 32. The piston 31 and one end cap 29 co-operate with the cylinder bore to define a first chamber 33. Similarly, the piston 31 and the other end cap 29 co-operate with the cylinder bore 27 to define a second chamber 34. When the pressure in the chamber 33 exceeds the pressure in the chamber 34, the piston 31 moves downwardly as viewed in FIGURE 4. Conversely, when the pressure in the second chamber 34 exceeds the pressure in the first chamber 33, the piston 31 moves upward.

The piston 31 is provided with spaced seals 36 so that the zone between the seals 36 is isolated from the two chambers 33 and 34. The side wall of the cylinder bore 27 is slotted at 37 to provide an opening through which the arm 22 projects. The arm 22, which is mounted on the first shaft 13, projects into a cross passage 38 formed in the piston 31 and is provided with a spherical end 39 which closely fits the walls of the passage 38. When the piston 31 moves upwardly, as viewed in FIGURE 4, the first shaft 13 is rotated through the connection of the arm 22 in a clockwise direction from the neutral position. Conversely, when the piston 31 moves downward, the shaft 13 is rotated in a counterclockwise direction. Rotation of the shaft 13, of course, rotates the associated canards 12 to control the rocket 10.

Referring again to FIGURE 2, a gas control and supply system is provided to operate the two actuators 23 and 26. A gas generator 41 filled with a solid propellant is used to supply gas under pressure to power the two actuators. A suitable electrical ignition means (not shown) is used to ignite the propellant within the gas generator. The choice of the propellant and the size of the generator is arranged so that the generator will continue to burn and supply gas under pressure for the required duty life of the control system.

First and second passages 42 and 43 connect the gas generator 41 to cross passages 44 and 46 respectively. Two normally closed electrically operated solenoid valves 47 and 48 are connected to the cross passage 44 with one at each end. The solenoid valve 47 is connected to one end of the actuator 26 through a passage 49 and the solenoid valve 48 is connected to one end of the actuator 23 through a passage 51. An additional two electrically operated normally closed solenoid valves 52 and 53 are connected to opposite ends of the cross passage 46. The solenoid valve 52 connects to the other end of the actuator 23 through a passage 54 and the solenoid valve 53 connects to the other end of the actuator 26 through a passage 56. Therefore, the two solenoid valves 48 and 52 connect to opposite ends of the actuator 23 and function to control the operation of this actuator. Similarly, the two solenoid valves 47 and 53 connect to opposite ends of the actuator 26 and are used to control this actuator.

Once a solid propellant type gas generator is ignited, it continues to burn until the propellant is exhausted. The burning generates gas under pressure continuously so a relief valve 57 is connected to the cross passage 44. This valve is designed to open when a predetermined maximum pressure is reached so that the system will not be overpressurized when all of the solenoid valves are closed. The predetermined maximum pressure setting of the relief valve 57 should be designed to be above the operating pressure of the two actuators 23 and 26 so that sufficient operating pressure is always available.

Referring again to FIGURE 4, the passage 51 opens into the first chamber 33 so that when the solenoid valve 48 is energized and opened, gas under pressure is supplied to the first chamber 33. The first chamber 33 is also provided with a restricted bleed orifice 58 open between the chamber 33 and a central chamber 59 in the body 28. The size of the bleed orifice 58 is proportioned so that the pressure within the chamber 33 will build up to a sufficient level to operate the piston 31 against the loads on the canards 12 and the centering force of the springs 32 but a continuous flow is still provided because a continuous supply of gas is being generated by the solid propellant gas generator 41. A similar restricted bleed orifice 61 connects between the second chamber 34 and the central chamber 59 and functions in a similar manner. The central chamber 59 is provided with symmetrical exhausts 60 spaced around the periphery of the rocket 10 so that the exhaust of the gases will not produce a net thrust on the rocket. The relief valve 57 is also arranged to exhaust into the central chamber 59 when it is operated.

Those skilled in the art will recognize that selective operation of the solenoid valves 47, 48, 52 and 53 will function to selectively operate the associated actuators 23 and 26 to control the position of the canards 12. Each of the solenoids is connected to the electrical guidance system of the rocket by appropriate electrical connections so that the canards are controlled in a manner determined by the guidance system. If no signal is applied to any of the solenoids, the centering springs 32 move the associated pistons 31 to the neutral position so that the canards are maintained in their neutral position. At this time, the relief valve 57 prevents overpressurization of the system.

When the guidance system requires motion of any of the canards in a particular direction, the appropriate solenoid valve is electrically opened and the associated actuator moves the canards to the required position. Those skilled in the art will recognize that an actuating and control system according to this invention provides a completely selfcontained, lightweight, compact unit capable of controlling the canards in any manner required. The use of the solid propellant gas generator as a source of actuation power does limit the duty life of the system but since rockets have a relatively short service life, this does not present a problem.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

We claim:

A missile control comprising a generally cylindrical body, a pair of shafts journaled in said body on axes contained in a single plane perpendicular to the axis of said body and which intersect each other perpendicularly, an offset on each shaft at such intersection providing clearance between said shafts, a control surface on each shaft, a pair of double acting piston and cylinder actuators, one of said actuators being associated with one of said shafts and extending parallel to the other of said shafts on the side of said one shaft remote from said other shaft, the other of said actuators being associated with said other shaft and extending parallel to said one shaft on the side of said other shaft remote from said one shaft, four elongated solenoid valves with two connected to each actuator and operable to selectively control the direction of movement of each actuator, said solenoid valves being symmetrically mounted in parallel relationship on said body with two laterally spaced on each side of said one actuator, an arm formed with a spherical end on each offset of each shaft, a lateral centrally located bore in each piston of each actuator closely receiving the spherical end of each arm on the associated shaft whereby axial motion of each piston produces rotation of each shaft about its axis, and a source of fluid under pressure mounted along the axis of said body connected to each solenoid.

References Cited by the Examiner

UNITED STATES PATENTS

| | | | |
|---|---|---|---|
| 2,414,898 | 1/1947 | Rous | 102—50 |
| 3,001,474 | 9/1961 | McLean et al. | 102—50 |
| 3,072,365 | 1/1963 | Linscott et al. | 102—50 |
| 3,104,081 | 9/1963 | Arnett | 244—14 |
| 3,132,590 | 5/1964 | Hall | 102—50 |

BENJAMIN A. BORCHELT, *Primary Examiner.*

SAMUEL FEINBERG, *Examiner.*

V. R. PENDEGRASS, *Assistant Examiner.*